US008587448B1

United States Patent
Culleny

(10) Patent No.: US 8,587,448 B1
(45) Date of Patent: Nov. 19, 2013

(54) SENSOR ACTIVATED BROKEN SCREEN SIMULATOR

(76) Inventor: Edward H. Culleny, Andover, NJ (US)

(*) Notice: Subject to any disclaimer, the term of this patent is extended or adjusted under 35 U.S.C. 154(b) by 248 days.

(21) Appl. No.: 13/083,989

(22) Filed: Apr. 11, 2011

(51) Int. Cl.
G08B 3/00 (2006.01)

(52) U.S. Cl.
USPC ........ 340/691.2; 340/507; 340/525; 340/505; 273/146; 273/378; 273/376; 345/173; 345/156; 345/104; 345/2.1; 345/204; 715/862; 463/43; 40/714; 40/760; 27/1

(58) Field of Classification Search
USPC ............... 340/691.2, 507, 525, 505; 273/146, 273/378, 376; 345/173, 156, 104, 2.1, 204; 715/862; 463/43; 40/714, 760; 27/1
See application file for complete search history.

(56) References Cited

U.S. PATENT DOCUMENTS

| 5,341,122 A | 8/1994 | Rickman |
| 5,447,760 A | 9/1995 | Watras |
| 6,241,620 B1 | 6/2001 | Santa Cruz et al. |
| 6,975,308 B1 * | 12/2005 | Bitetto et al. .................. 345/204 |
| 2005/0221900 A1 * | 10/2005 | Hall .................................. 472/72 |
| 2005/0246877 A1 * | 11/2005 | Davis et al. ......................... 27/1 |
| 2006/0007180 A1 * | 1/2006 | Tremaine et al. ............. 345/173 |
| 2009/0111577 A1 * | 4/2009 | Mead .............................. 463/31 |
| 2009/0221354 A1 | 9/2009 | Shai-Hee |
| 2010/0180483 A1 * | 7/2010 | Mindel ........................... 40/760 |
| 2010/0241998 A1 * | 9/2010 | Latta et al. .................... 715/862 |
| 2011/0232146 A1 * | 9/2011 | Lin .................................. 40/714 |
| 2011/0244959 A1 * | 10/2011 | Inagaki et al. .................. 463/31 |

FOREIGN PATENT DOCUMENTS

JP 2006/065031 * 9/2006 ............. H01L 51/50

* cited by examiner

Primary Examiner — Benjamin C Lee
Assistant Examiner — Chico A Foxx

(57) ABSTRACT

A sensor activated broken screen simulator is provided for simulating a screen breaking in response to a detected motion. The simulator includes a frame configured for coupling to a monitor. The monitor has a viewing portion and the frame is positioned such that the frame extends around the viewing portion of the monitor. A screen is coupled to and positioned in the frame such that the screen is positioned over the viewing portion of the monitor when the frame is coupled to the monitor. The screen is transparent when inactive but displays an image of broken glass when activated. A sensor is coupled to the frame and operationally coupled to the screen to activate the screen upon detection of a pre-determined condition.

9 Claims, 4 Drawing Sheets

SENSOR ACTIVATED BROKEN SCREEN SIMULATOR

BACKGROUND OF THE DISCLOSURE

1. Field of the Disclosure

The disclosure relates to broken glass simulation devices and more particularly pertains to a new broken glass simulation device for simulating a screen breaking responsive to a detected motion.

2. Summary of the Disclosure

An embodiment of the disclosure meets the needs presented above by generally comprising a frame configured for coupling to a monitor. The monitor has a viewing portion and the frame is positioned such that the frame extends around the viewing portion of the monitor. A screen is coupled to and positioned in the frame such that the screen is positioned over the viewing portion of the monitor when the frame is coupled to the monitor. The screen is transparent when inactive but displays an image of broken glass when activated. A sensor is coupled to the frame and operationally coupled to the screen to activate the screen upon detection of a pre-determined condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
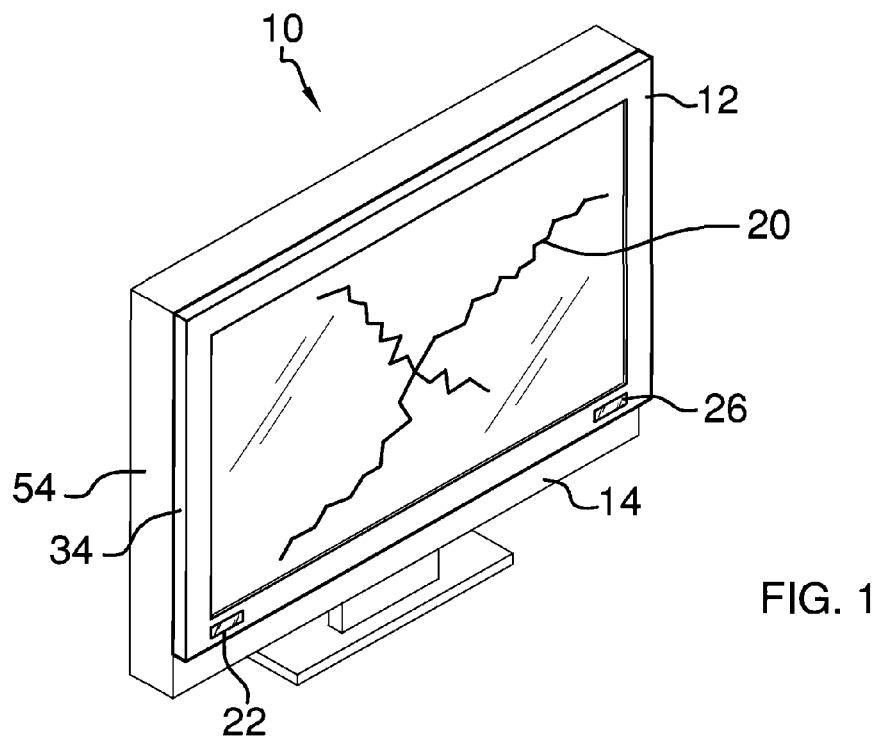
FIG. 1 is a top front side perspective view of a sensor activated broken screen simulator according to an embodiment of the disclosure.
Figure 2:
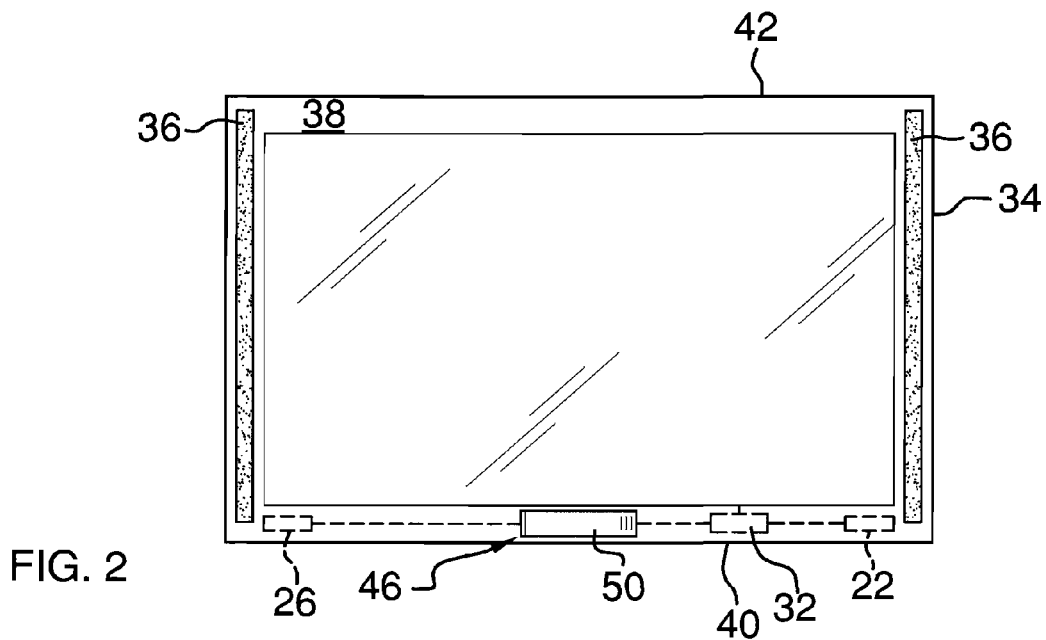
FIG. 2 is a rear view of an embodiment of the disclosure.
Figure 3:
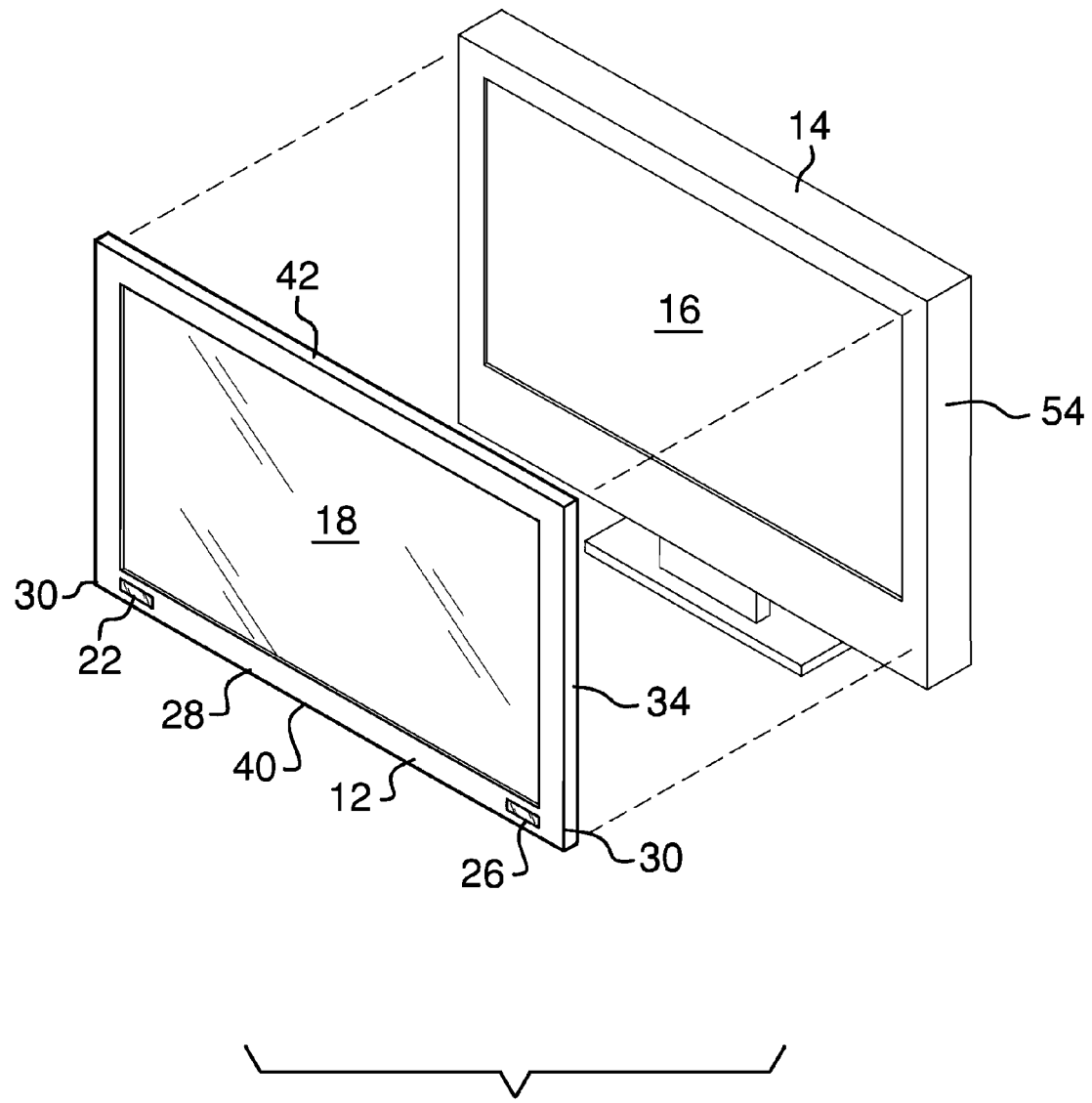
FIG. 3 is a top front side perspective view of an embodiment of the disclosure.

With reference now to the drawings, and in particular to FIGS. 1 through 5 thereof, a new broken glass simulation device embodying the principles and concepts of an embodiment of the disclosure and generally designated by the reference numeral 10 will be described.

Figure 4:
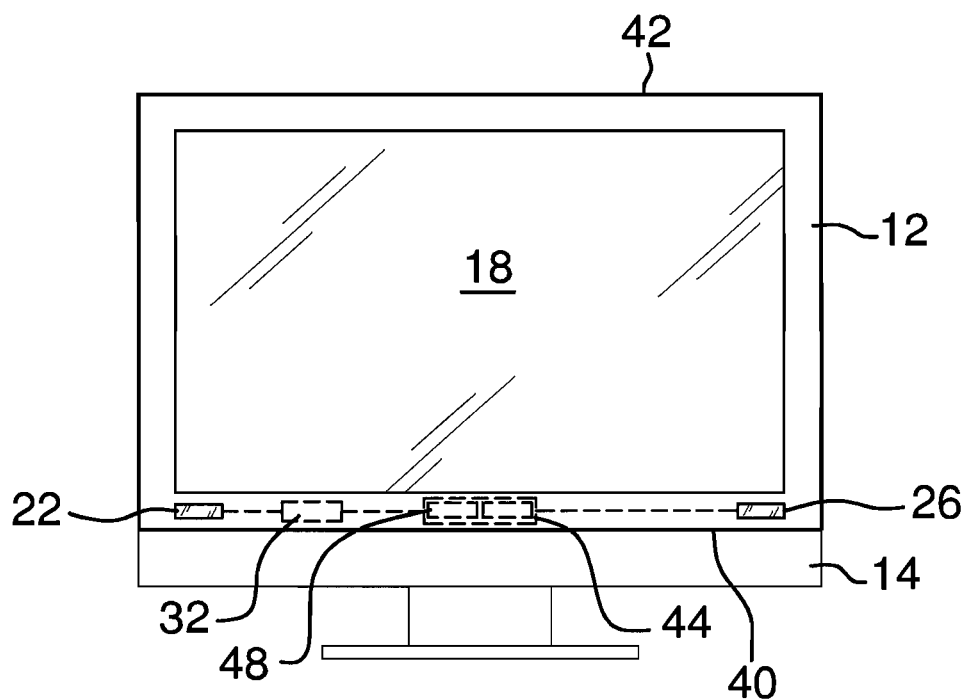
FIG. 4 is a front view of an embodiment of the disclosure.
Figure 5:
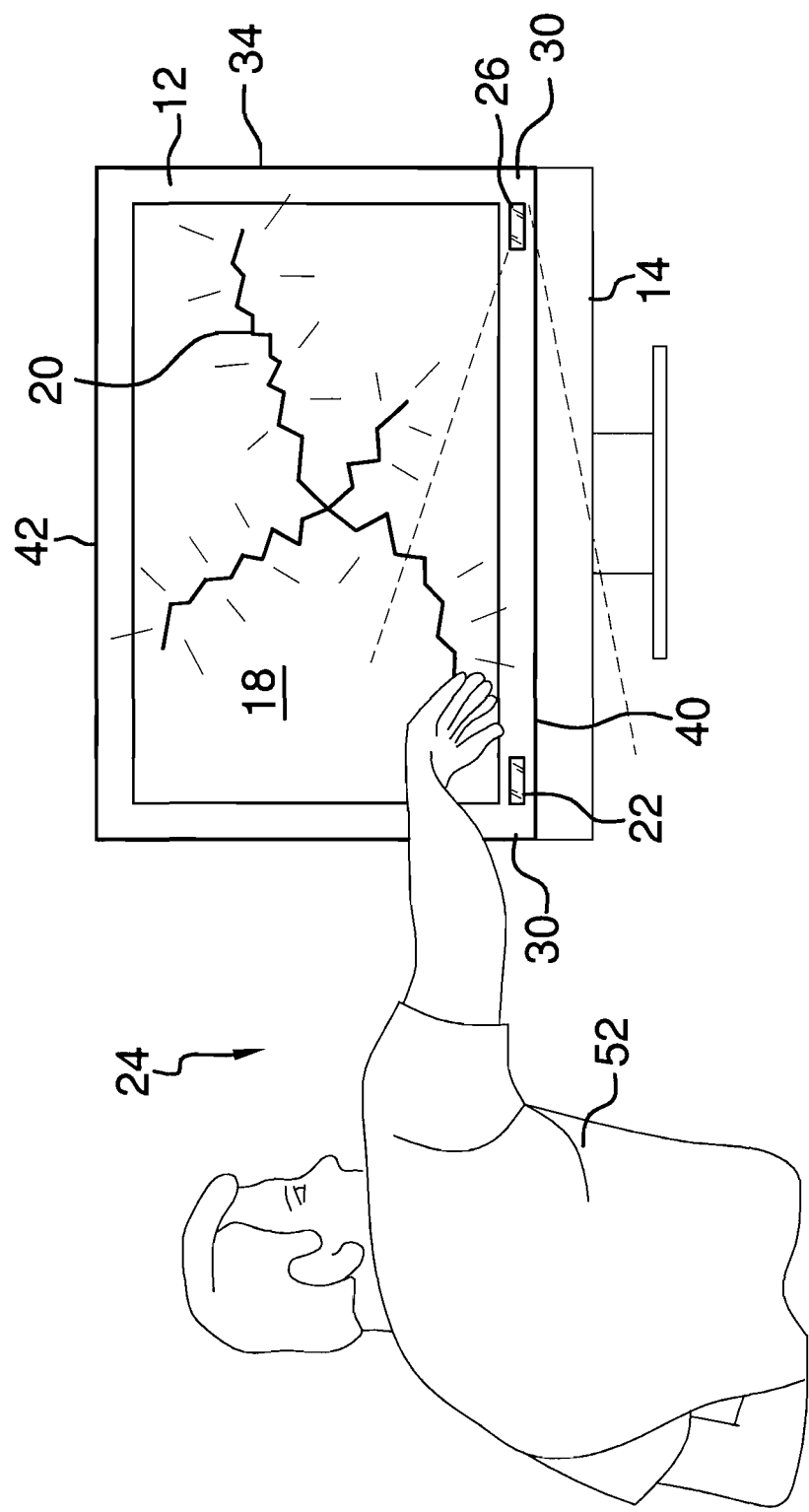
FIG. 5 is a front view of an embodiment of the disclosure in use.

As best illustrated in FIGS. 1 through 5, the sensor activated broken screen simulator 10 generally comprises a frame 12 configured for coupling to a monitor 14. The monitor 14 has a viewing portion 16 and the frame 12 extends around the viewing portion 16 of the monitor 14. A screen 18 is positioned in the frame 12. The screen 18 is positioned over the viewing portion 16 of the monitor 14 when the frame 12 is coupled to the monitor 14. The screen 18 is transparent when inactive as shown in FIG. 4. The screen 18 displays an image 20 of broken glass when activated whereby the underlying viewing portion 16 of the monitor 14 would also appear to be broken. A first sensor 22 is coupled to the frame 12. The first sensor 22 is operationally coupled to the screen 18 to activate the screen 18 upon detection of a pre-determined condition 24. The pre-determined condition 24 may be a throwing motion towards the screen 18 as shown in FIG. 5. A second sensor 26 may be coupled to the frame 12. The second sensor 26 is also operationally coupled to the screen 18 to activate the screen 18 upon detection of the pre-determined condition 24. The first sensor 22 and second sensor 26 are spaced apart and each may be positioned on a bottom portion 28 of the frame 12 adjacent a respective lower corner 30 of the frame 12. A timer 32 may be coupled to the frame 12. The timer 32 is operationally coupled to the screen 18 to deactivate the screen 18 after a pre-determined time period after activation of the screen 18. The screen 18, first sensor 22 and second sensor 26 are then reset to be reactivated upon another detection of the pre-determined condition 24.

In order to attach the frame 12 and screen 18 to the monitor 14, a pair of adhesive strips 36 may be employed. Each adhesive strip 36 is coupled to a planar rear face 38 of the frame 12. Thus, the frame 12 is configured for being coupled to the monitor 14. The adhesive strips 36 are spaced apart. Each adhesive strip 36 is coupled to an associated one of a pair of side portions 38 extending between a bottom 40 of the frame 12 and a top 42 of the frame 12. Alternatives such as hook and loop fastener or hooks may also be utilized to position the screen 18 over the viewing portion 16 of the monitor 14. The rear face 38 of the frame 12 is configured to abut the monitor 14 in a manner that that frame 12 appears to be integrally incorporated into the structure of the monitor 14. The frame 12 may be sized so that an outer perimeter 34 of the frame 12 aligns with an outer edge 54 of the monitor 14.

A battery compartment 44 may be positioned in the frame 12. The battery compartment 44 forms an opening 46 in the rear face 38 of the frame 12. A battery 48 is positioned in the battery compartment 46. The battery 48 is electrically coupled to the first sensor 22, the second sensor 26, and the screen 18. A battery compartment cover 50 may be coupled to the frame 12 to cover the opening 46 in the rear face 38 of the frame 12.

In use, the frame 12 attaches to the monitor 14 in a manner that the frame 12 appears to be integrally incorporated into the structure of the monitor 14. When a person 52 feels tension or stress they can assume a position in range of the first sensor 22 or second sensor 26 and move to provide the pre-determined condition 24. By moving to simulate throwing an object at the monitor 14, the screen 18 is activated to display the image 20 simulating the consequences of throwing an item at the monitor 14 without actually damaging the monitor 14. The timer 32 resets the screen 18 to permit the person 52 to repeat the stress or tension relieving action repeatedly if so desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A broken screen simulator assembly comprising:
   a frame;
   a monitor having a viewing portion, said frame being attached to said monitor such that said frame extends around the viewing portion of the monitor, a rear face of said frame being attached to a border of said monitor;
   a screen positioned in said frame whereby said screen is positioned over the viewing portion of the monitor when the frame is coupled to the monitor, said screen being transparent when inactive, said screen displaying an image of broken glass when activated; and
   a first sensor coupled to said frame, said first sensor being operationally coupled to said screen to activate said screen upon detection of a pre-determined condition, said pre-determined condition being a throwing motion towards said screen.

2. The assembly of claim 1, further including a strip of adhesive coupled to said rear face of said frame whereby said frame is adhesively coupled to the monitor.

3. The assembly of claim 1, further including a second sensor coupled to said frame, said second sensor being operationally coupled to said screen to activate said screen upon detection of the pre-determined condition.

4. The assembly of claim 3, wherein said first sensor and said second sensor are spaced apart and said first sensor and said second sensor are each positioned on a bottom portion of said frame adjacent a respective lower corner of said frame.

5. The assembly of claim 1, further comprising:
   a battery compartment positioned in said frame; and
   a battery positioned in said battery compartment, said battery being electrically coupled to said sensor and said screen.

6. The assembly of claim 5, wherein said battery compartment forms an opening in a rear face of said frame.

7. The assembly of claim 6, further including a battery compartment cover coupled to said frame to cover said opening in said rear face of said frame.

8. The assembly of claim 1, further including a timer coupled to said frame, said timer being operationally coupled to said screen to deactivate said screen after a pre-determined time period after activation of said screen.

9. A broken screen simulator assembly comprising:
   a frame, said frame being configured for coupling to a monitor having a viewing portion such that said frame extends around the viewing portion of the monitor;
   a screen positioned in said frame whereby said screen is positioned over the viewing portion of the monitor when the frame is coupled to the monitor, said screen being transparent when inactive, said screen displaying an image of broken glass when activated;
   a first sensor coupled to said frame, said first sensor being operationally coupled to said screen to activate said screen upon detection of a pre-determined condition, wherein said pre-determined condition is a throwing motion towards said screen;
   a second sensor coupled to said frame, said second sensor being operationally coupled to said screen to activate said screen upon detection of said pre-determined condition, wherein said first sensor and said second sensor are spaced apart and said first sensor and said second sensor are each positioned on a bottom portion of said frame adjacent a respective lower corner of said frame;
   a timer coupled to said frame, said timer being operationally coupled to said screen to deactivate said screen after a pre-determined time period after activation of said screen;
   a pair of adhesive strips, each said adhesive strip being coupled to a rear face of said frame whereby said frame is configured for being coupled to the monitor, wherein said adhesive strips are spaced apart, each said adhesive strip being coupled to an associated one of a pair of side portions extending between a bottom of said frame and a top of said frame;
   a battery compartment positioned in said frame, wherein said battery compartment forms an opening in a rear face of said frame;
   a battery positioned in said battery compartment, said battery being electrically coupled to said sensor and said screen; and
   a battery compartment cover coupled to said frame to cover said opening in said rear face of said frame.

* * * * *